(12) United States Patent
Lyons

(10) Patent No.: US 6,527,217 B1
(45) Date of Patent: Mar. 4, 2003

(54) BOBBIN FOR TYING A FISHING FLY

(76) Inventor: David C. Lyons, 3219 Windmill Dr., Beavercreek, OH (US) 45432

( * ) Notice: Subject to any disclaimer, the term of this patent is extended or adjusted under 35 U.S.C. 154(b) by 0 days.

(21) Appl. No.: 10/170,735

(22) Filed: Jun. 13, 2002

(51) Int. Cl.$^7$ .................. B65H 59/02; B65H 49/00; B21C 47/14
(52) U.S. Cl. ............... 242/423.2; 242/129.53; 242/442; 242/566; 242/588
(58) Field of Search .............. 242/566, 129.53, 242/423.2, 442, 588; 43/4; 289/17

(56) References Cited

U.S. PATENT DOCUMENTS

| | | | |
|---|---|---|---|
| 2,220,878 A | * 11/1940 | Harvey | 242/442 |
| 2,487,625 A | * 11/1949 | Witkovic | 242/129.53 |
| 2,578,045 A | * 12/1951 | Conrad et al. | 242/129.53 |
| 2,659,548 A | * 11/1953 | Morgester | 242/129.53 |
| 4,189,111 A | 2/1980 | Doiron | |
| 4,462,551 A | 7/1984 | Bloch | |
| 4,870,772 A | 10/1989 | Johns | |
| 5,076,510 A | 12/1991 | Norlander | |
| 6,179,240 B1 | 1/2001 | Todd | |
| 2001/0042296 A1 | 11/2001 | Yonenoi | |

* cited by examiner

*Primary Examiner*—Michael R. Mansen
(74) *Attorney, Agent, or Firm*—R. William Graham

(57) ABSTRACT

A bobbin for tying a fishing fly includes a pair of arms connected at respective first ends and spaced at respective second ends, each second end having a generally axially spaced bearing surface configured to receive a hub of a spool. A tube for receives a thread from the spool and a screw is connected to the arms generally between the first ends and the second ends and extends generally parallel to the axially spaced bearings for adjustably controlling the arms in a manner to apply an amount of pressure on the hubs of the spool wherein the screw is configured to permit one's hand holding the bobbin to adjust the screw.

10 Claims, 2 Drawing Sheets

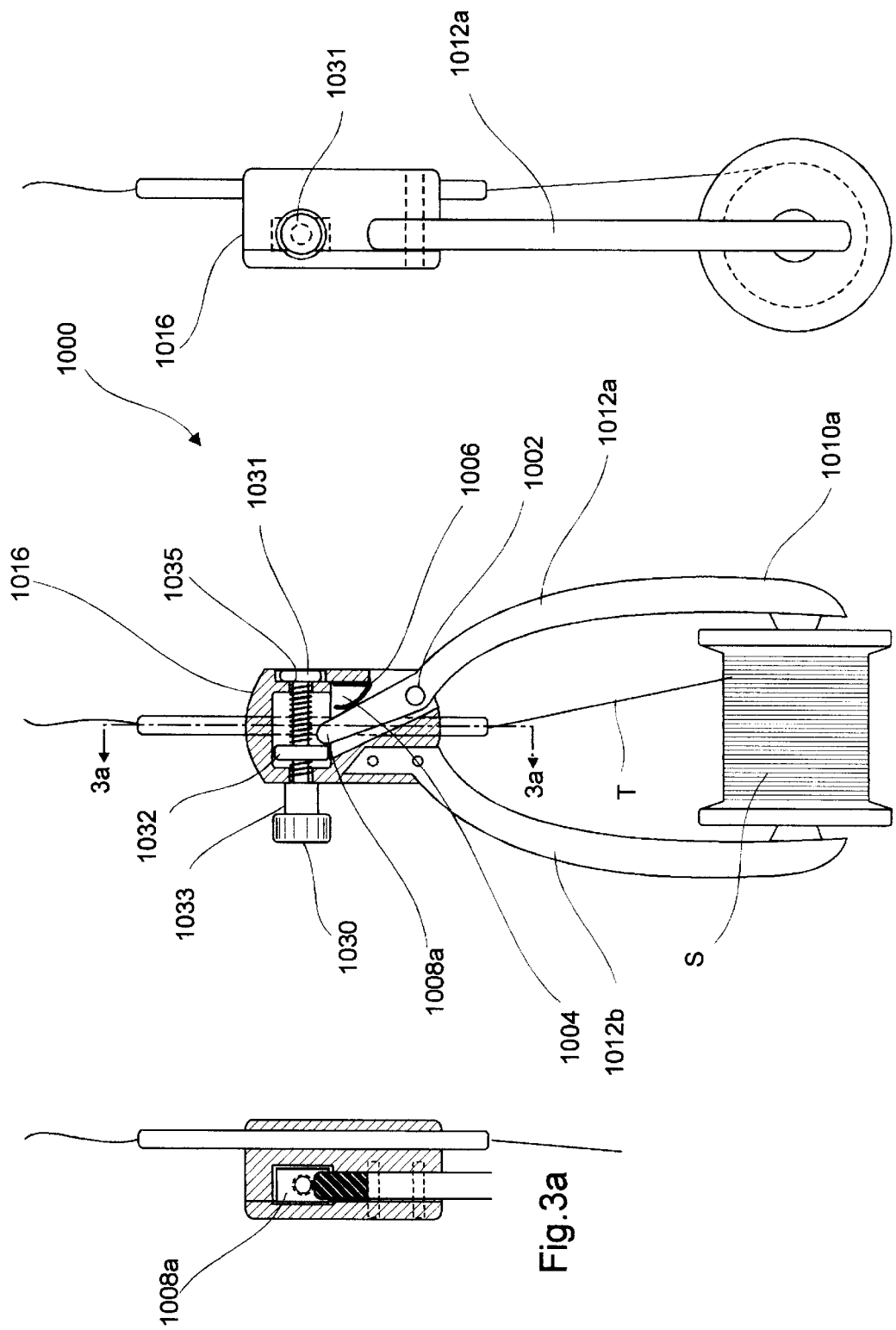

BOBBIN FOR TYING A FISHING FLY

BACKGROUND OF THE INVENTION

1. Field of the Invention

The present invention relates to fly fishing and more particularly, this invention relates to an improved tool for tying flies.

2. Related Art

Various bobbins exist for tying fishing flies. In order to tie a fishing fly, the bobbin holds a spool of thread with a certain amount of pressure at its hub thus providing tension as the thread is pulled and wound on the fly. Typically, the thread can be silk, nylon or the like for tying a fly head or wool or floss for other desired features of the fly.

Bobbins typically have a pair of flexible arms formed to retain a spool of thread and have a hollow tube or guide projecting forwardly from the juncture of the arms. Thread from the spool is passed through the tube and which is used to feed the thread to a desired location when wrapping feathers, bits of cloth, etc., to secure these items to a hook in a desired manner. To tie the thread off, a knot-positioning tool is used as is known in the art. The thread is then severed, loose ends are trimmed off and the fishing fly is completed. Fish hooks vary in size and knot-positioning tools are used to aid in receipt the eye of each different sized fish hook.

Traditional fly tying bobbins place drag on the spool by using two arms of a springy material (such as metal, plastic, etc.) which place a fixed frictional force against the ends of the spool through a round or cone shaped piece affixed to the end of the arm which fits into the hole which runs through the center of the spool of tying material. The only way the frictional force of the arms may be changed in this design, and thus the tension on the fly tying material, is to remove the spool and physically bend the arms inward or outward to increase or decrease the tension. The only other way to alter tension is to squeeze the spool with the hand to increase tension.

The first method is virtually impossible to accomplish once the tying has begun. The second tends to be extremely awkward. In addition, to remove the spool of material from a traditional bobbin, the arms holding the material must be pulled apart to remove the spool and to replace it with another. This is both inconvenient and slows the tying process considerably.

The problem remains with tying a fly correctly, specifically, holding the spool in a manner to create a desired amount of resistance against the spool (and thus tension in the thread) in order to tie a particular fly feature, such as a tight knot. Tension is not easily controlled using current bobbins and thus the ability to easily tie a fly is difficult. Consequently, there remains a need to improve bobbin designs.

BRIEF SUMMARY OF THE INVENTION

It is an object to improve the field of fly fishing.

It is another object to improve bobbin design for tying a fishing fly.

It is a further object to provide an improved bobbin which can be operated more easily than the prior bobbins.

Accordingly, the present invention is directed to a bobbin for tying a fishing fly. The bobbin includes a pair of arms connected at respective first ends and spaced at respective second ends, each second end having a generally axially spaced bearing surface configured to receive a hub of a spool such that when so received, the spool is held between the bearing surfaces with a predetermined force. The bobbin further includes a tube for receiving and carrying a thread from the spool and a controller connected to the arms for adjustably controlling the arms in a manner to apply a desired amount of pressure on the hubs of the hubs of the spool. Thus, an increase of pressure decreases ease of rotation of the spool and a decrease of pressure increases ease of rotation of the spool.

The arms can be spring-like and the controller can include a biasing device. In one embodiment, the biasing occurs against the first ends whereas in another embodiment biasing occurs against the second ends. Further, one embodiment depicts first ends relatively fixed to one another whereas another embodiment depicts movable connection.

The biasing device can include a threaded male member and a female threaded member interconnecting the arms in a manner such that threading the female member in one direction with respect to the male member imparts an outward displacing force between the second ends and in another direction imparts an inward displacing force between the second ends. In one embodiment, the arms are connected about a pivot point.

Other objects and advantages will be readily apparent to those skilled in the art upon viewing the drawings and reading the detailed description hereafter.

BRIEF DESCRIPTION OF THE DRAWINGS

FIG. 3 is a front view in elevation of still another embodiment of the invention;

FIG. 3a is a view in section taken along line 3a—3a of FIG. 3; and FIG. 3b is a side view of FIG. 3.

DETAILED DESCRIPTION OF THE INVENTION

Figure 2:
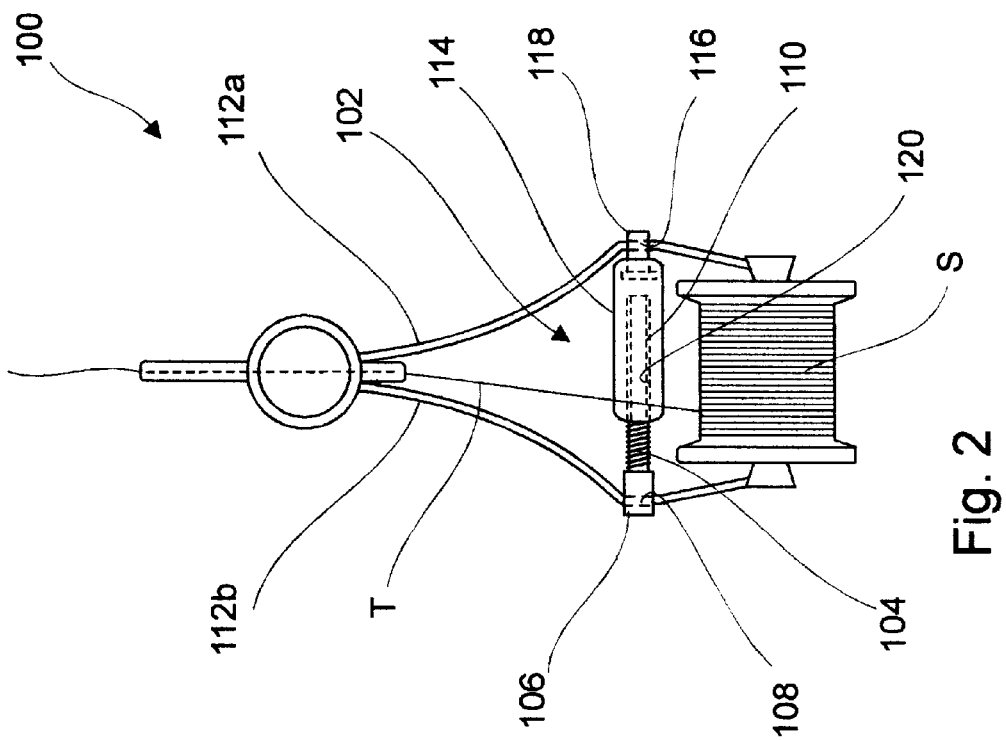
FIG. 2 is a front view in elevation of another embodiment of a bobbin of the invention.

Referring now to drawings, the bobbin of the present invention is generally designated by the numerals 10, 100 and 1000. For simplicity, parts of similar construction between the embodiments shall be deemed to similar those described with respect to the bobbin 10.

The bobbin 10 is formed of a pair of arms 12a and 12b having first ends 14a and 14b, respectively, which are connected by a connector 16 having slots 18a and 18b to receive ends 14a and 14b, respectively. The connector 16 also includes a channel 20 which receives a tube 22 which serves as a guide for receiving a tying material or thread T therethrough.

The arms 12a and 12b include second ends 23a and 23b, respectively, having bearing surfaces 24a and 24b which are of a size and configuration and are generally coaxially disposed from one another and to be receivably seated within hubs 26a and 26b, respectively, of spool S. The bearing surfaces 24a and 24b can be tapered disc shape with a slightly larger diameter than the hubs 26a and 26b.

The arms 12a and 12b can be resilient and spring-like and are formed in a bent manner having ends 23a and 23b spaced a predetermined distance from one another, which preferably can be of a space such that the bearing surfaces 24a and 24b naturally permit retention of the hubs 26a and 26b, respectively. Optionally, one or more arms 12a and 12b can be made of a flexible springy material such as steel, plastic, titanium etc.

The arms 12a and 12b can include bores 28a and 28b which receive a threaded bolt 30 therethrough. A threaded nut 32 receives a threaded end 34 of the bolt 30 which can extend through bore 28a. A bolt head 36 can hold the bolt 30 from passing through the bore 28b. It is recognized that one or more of the bores 28a and 28b can be threaded to accomplish the function of the nut 32.

The spool S of thread T is inserted in the bobbin 10 by spreading the arms 12a and 12b and inserting the bearing surfaces 24a and 24b into the hubs 26a and 26b, respectively. A length of thread T is unreeled and threaded through the tube 22 until an end emerges through the tube 22. The thread may be silk, nylon, wool, floss yarn, wire, etc. and the tube 22 of metal, ceramic material a tough, self-lubricating, engineering plastic such as Teflon (polytetrafluoroethylene), Nylon (a polyamide), polyethylene or polypropylene.

The bobbin 10 is used to wind the tying material T around a hook to both shape the body of the fly and to hold feathers and other tying materials in place. This often can require tying materials to be wrapped at different tensions. Failure to use the proper tension often results in a ruined fly or snapping the tying material T due to too much tension.

Fly tying also requires frequent changes of spools of tying material, sometimes two or three times during the tying of a single fly. Thus, the ability to quickly and easily change spools is of great importance.

The present invention has addressed the aforementioned problems by incorporating threaded bolt 30 and nut 32 which, by tightening or loosening, applies a pressure to the arms 12a and 12b and in turn the hubs 26a and 26b of the spool S and, through friction, changes the tension on the fly tying material. Unlike prior bobbins which require the user to stop winding with the bobbin and to use the hand not holding the bobbin to adjust the spool, the present invention permits the hand holding the bobbin 10 to perform the function of moving the nut 32 with one of the fingers on such holding hand while permitting the other hand to continue the tying function. Further, the present invention permits changing of spool S without the need to remove the threaded nut 32 and bolt 30. This is both convenient and efficient.

In other words, the design of the present invention addresses the tensioning issue by using a screw thread device to act directly in the arms holding the spool rather than on the spool directly, moving them inward or outward, thereby causing the ends holding the spool to increase or decrease friction against the spool thus increasing or decreasing tension on the material being unwound from the spool. It is contemplated that there are various ways that the screw thread device can be used to tension the arms against the spool.

Figure 1:
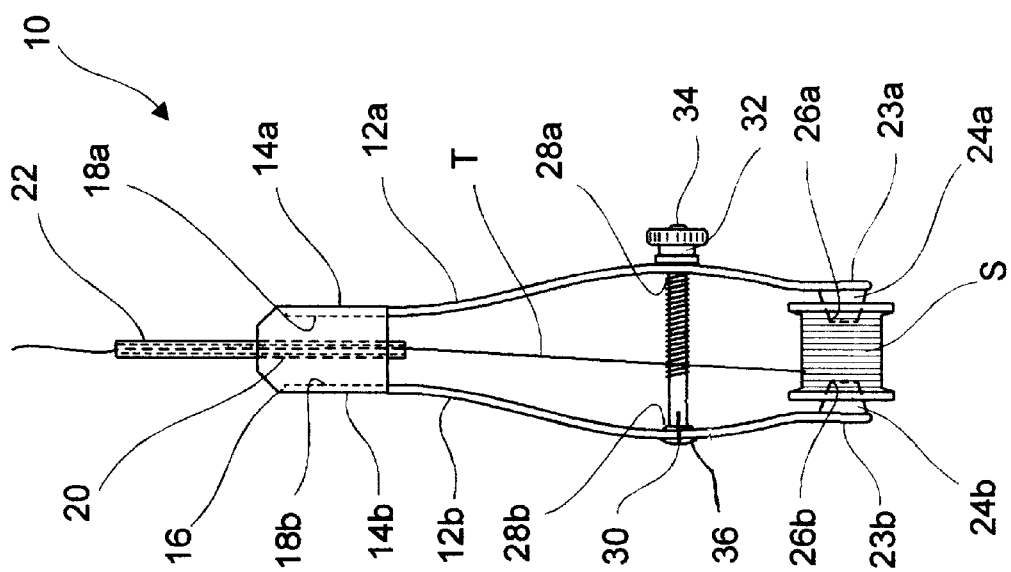
FIG. 1 is a front view in elevation of a bobbin of the invention.

FIG. 1 depicts the bobbin 10 as described above. While the threaded bolt 30 is shown in above the spool S, it is contemplated that a tension device can connect to the spool S in other manners as long as it connects the two arms. For example, FIG. 2 shows another variation which is a modified conventional bobbin 100. Here, the bobbin 100 is made adjustable by the addition of a retrofit threaded screw device 102. The threaded screw device 102 includes male post 104 having an arm receiving end portion 106 which can include a groove 108 to receive the arm 112b and also includes a threaded end portion 110.

The screw device 102 includes a female sleeve 114 which similarly has an arm receiving end portion 116 which can include a groove 118 to receive the arm 112a. The sleeve 114 includes an inner threaded end 120 which receives the threaded end 110.

FIGS. 3, 3a and 3b show another embodiment of bobbin 1000 whereby one of the two holding arms, arm 1012b, is fixed in a connector 1016 and the other arm 1012a is allowed to move around a pivot pin 1002 in a cavity 1004 within the connector 1016. A threaded screw 1030 runs through connector 1016 above the arm 1012 and the pivot pin 1002. A small spring 1006 resides inside the cavity 1004 to bias against the arm 1012a. A sliding nut 1032 is operably disposed on the screw 1030 to travel and impinges upon an end 1008a of the arm 1012a. One end 1031 of the screw 1030 is operably seated in a bearing 1035. As the head 1033 of the screw 1030 is turned in one direction, for example, it forces the end 1010a arm inward, and in the other direction it releases pressure on the arm 1012a allowing the spring 1006 to move the arm outward. The resulting increase and decrease in frictional forces increases or decreases the tension on the material being unwound from the spool S. The orientation of the parts can be reversed, for example, a spring can be above the pivot point and the screw device below the pivot within a connector. The functional result is the same, except that the direction of rotation the screw device will also reverse clockwise to release tension and clockwise to increase it.

Each of the above variations allows for a way to dynamically vary the tension on the spool of tying material as it is being wound around the hook using the same hand that holds the bobbin. In each of these variations it is possible to rotate the nut with one of the fingers of the hand holding the bobbin as it is moving around the hook. The other hand is left free to hold the other materials being tied to the hook.

This design approach also solves the spool change problems inherent in current bobbin designs. In each of the described variations rotating the tension nut past a certain point will allow the arms to separate far enough to allow the spool to drop free. Reversing the nut allows the bobbin to re-clamp the spool. No prying or disassembly is required. This concept of using a screw thread acting on one or both of the arms holding the spool is intended to cover all variations where the arms are moved inward or outward via this screw device.

It is to be realized that only preferred embodiments of the invention have been described and that numerous substitutions, modifications and alterations are permissible without departing from the spirit and scope of the invention as defined in the following claims. The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A bobbin for tying a fishing fly, comprising:
   a pair of arms connected at respective first ends and spaced at respective second ends, each second end having a generally axially spaced bearing surface configured to receive a hub of a spool such that when so received, the spool is held between said bearing surfaces with a predetermined force;
   a tube for receiving and carrying a thread from the spool; and
   screw means connected to said arms positioned generally between said first ends and said second ends and extending generally parallel to said axially spaced bearings for adjustably controlling said arms in a manner to apply an amount of pressure on the hubs of the spool, wherein increased pressure decreases ease of rotation of the hubs of the spool and decreased pressure increases ease of rotation of the hubs of the spool, wherein said screw means is configured to permit one's hand holding said bobbin to adjust said screw means.

2. The bobbin for tying a fishing fly of claim 1, in which the arms are spring-like and said controlling means includes means for controllably biasing against said second ends.

3. The bobbin for tying a fishing fly of claim 2, and wherein said first ends are fixably connected.

4. The bobbin for tying a fishing fly of claim 2, wherein said biasing means includes a threaded male member and a female threaded member interconnecting said second ends in a manner such that threading said female member in one direction with respect to said male member imparts an outward displacing force between said second ends and in another direction imparts an inward displacing force between said second ends.

5. The bobbin for tying a fishing fly of claim 4 and wherein said first ends are fixably connected.

6. The bobbin for tying a fishing fly of claim 1, and wherein said first ends are fixably connected.

7. The bobbin for tying a fishing fly of claim 1, and wherein said first ends are movably connected.

8. The bobbin for tying a fishing fly of claim 1, in which said controlling means includes means for controllably biasing against said first ends second ends.

9. The bobbin for tying a fishing fly of claim 1, wherein said arms are connected about a pivot and said controlling means includes means for biasing against said arms about said pivot.

10. The bobbin for tying a fishing fly of claim 1, wherein said biasing means includes a threaded male member and a female threaded member interconnecting said first ends in a manner such that threading said female member in one direction with respect to said male member increases distance between said second ends and in another direction decreases distance between said second ends.

\* \* \* \* \*